US011860783B2

(12) United States Patent
Agarwal et al.

(10) Patent No.: US 11,860,783 B2
(45) Date of Patent: Jan. 2, 2024

(54) DIRECT SWAP CACHING WITH NOISY NEIGHBOR MITIGATION AND DYNAMIC ADDRESS RANGE ASSIGNMENT

(71) Applicant: Microsoft Technology Licensing, LLC, Redmond, WA (US)

(72) Inventors: Ishwar Agarwal, Redmond, WA (US); Yevgeniy Bak, Redmond, WA (US); Lisa Ru-feng Hsu, Durham, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/735,767

(22) Filed: May 3, 2022

(65) Prior Publication Data

US 2023/0289288 A1 Sep. 14, 2023

Related U.S. Application Data

(60) Provisional application No. 63/319,109, filed on Mar. 11, 2022.

(51) Int. Cl.
*G06F 12/08* (2016.01)
*G06F 12/0802* (2016.01)

(52) U.S. Cl.
CPC ...... *G06F 12/0802* (2013.01); *G06F 2212/62* (2013.01)

(58) Field of Classification Search
CPC .......................... G06F 12/0802; G06F 2212/62
USPC ........................................................ 711/118
See application file for complete search history.

(56) References Cited

U.S. PATENT DOCUMENTS

| 2016/0299712 A1 | 10/2016 | Kishan et al. |
| 2018/0260323 A1 | 9/2018 | John et al. |
| 2019/0391843 A1* | 12/2019 | Franciosi ............ G06F 12/1072 |
| 2020/0341673 A1* | 10/2020 | Iyer ...................... G06F 12/109 |

(Continued)

FOREIGN PATENT DOCUMENTS

| WO | 2014143036 A1 | 9/2014 |
| WO | 2020007813 A1 | 1/2020 |
| WO | 2021057489 A1 | 4/2021 |

OTHER PUBLICATIONS

"International Search Report and Written Opinion Issued in PCT Application No. PCT/US22/052607", dated Apr. 6, 2023, 19 Pages.

*Primary Examiner* — Hua J Song
(74) *Attorney, Agent, or Firm* — Ranjeev Singh; Singh Law, PLLC

(57) ABSTRACT

Systems and methods related to direct swap caching with noisy neighbor mitigation and dynamic address range assignment are described. A system includes a host operating system (OS), configured to support a first set of tenants associated with a compute node, where the host OS has access to: (1) a first swappable range of memory addresses associated with a near memory and (2) a second swappable range of memory addresses associated with a far memory. The host OS is configured to allocate memory in a granular fashion such that each allocation of memory to a tenant includes memory addresses corresponding to a conflict set having a conflict set size. The conflict set includes a first conflicting region associated with the first swappable range of memory addresses with the near memory and a second conflicting region associated with the second swappable range of memory addresses with the far memory.

20 Claims, 12 Drawing Sheets

(56) References Cited

U.S. PATENT DOCUMENTS

| | | |
|---|---|---|
| 2020/0394065 A1 | 12/2020 | Bak et al. |
| 2021/0089465 A1 | 3/2021 | Prabhakar et al. |
| 2021/0208791 A1* | 7/2021 | Peterson ................. G06F 12/08 |

* cited by examiner

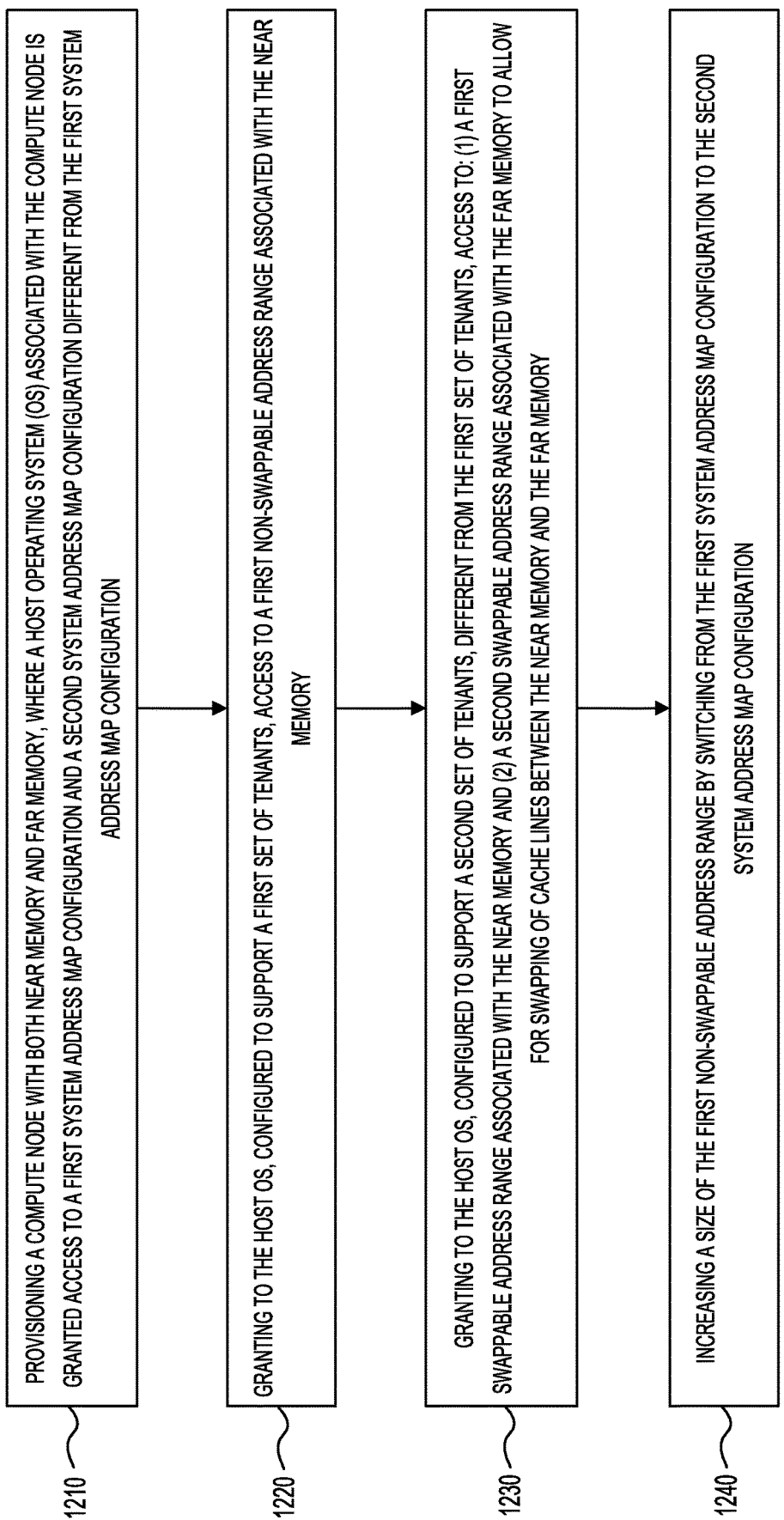

DIRECT SWAP CACHING WITH NOISY NEIGHBOR MITIGATION AND DYNAMIC ADDRESS RANGE ASSIGNMENT

CROSS-REFERENCE TO A RELATED APPLICATION

This application claims the benefit of U.S. Provisional Application No. 63/319,109, filed Mar. 11, 2022, titled "DIRECT SWAP CACHING WITH NOISY NEIGHBOR MITIGATION AND DYNAMIC ADDRESS RANGE ASSIGNMENT" the entire contents of which are hereby incorporated herein by reference.

BACKGROUND

Multiple tenants may share systems, including computing systems and communications systems. Computing systems may include the public cloud, the private cloud, or a hybrid cloud having both public and private portions. The public cloud includes a global network of servers that perform a variety of functions, including storing and managing data, running applications, and delivering content or services, such as streaming videos, provisioning electronic mail, providing office productivity software, or handling social media. The servers and other components may be located in data centers across the world. While the public cloud offers services to the public over the Internet, businesses may use private clouds or hybrid clouds. Both private and hybrid clouds also include a network of servers housed in data centers.

Multiple tenants may use compute, storage, and networking resources associated with the servers in the cloud. The compute, storage, and networking resources may be provisioned using a host operating system (OS) installed on a compute node (e.g., a server) in a data center. Each host OS may allow multiple tenants, such as a virtual machine, to access the compute and memory resources associated with a respective compute node. Each tenant may be allocated a certain amount of memory reflective of a certain number of cache lines. In some instances, conflicting cache lines in the near memory (e.g., the DRAM) may be allocated to different tenants. This may cause a tenant's activities to create issues for another tenant, including reduced memory bandwidth and capacity.

SUMMARY

In one example, the present disclosure relates to a system including a compute node providing access to both near memory and far memory. The system may further include a host operating system (OS), configured to support a first set of tenants associated with the compute node, where the host OS having access to: (1) a first swappable range of memory addresses associated with the near memory and (2) a second swappable range of memory addresses associated with the far memory to allow for swapping of cache lines between the near memory and the far memory. The system may further include the host OS configured to allocate memory in a granular fashion to any of the first set of tenants such that each allocation of memory to a tenant includes memory addresses corresponding to a conflict set having a conflict set size. The conflict set may include a first conflicting region associated with the first swappable range of memory addresses associated with the near memory and a second conflicting region associated with the second swappable range of memory addresses associated with the far memory, and where each of the first conflicting region and the second conflicting region having a same size that is selected to be equal to or less than half of the conflict set size.

In addition, the present disclosure relates to a method including provisioning a compute node with both near memory and far memory. The method may further include granting to a host operating system (OS), configured to support a first set of tenants associated with the compute node, access to: (1) a first swappable range of memory addresses associated with the near memory and (2) a second swappable range of memory addresses associated with the far memory to allow for swapping of cache lines between the near memory and the far memory. The method may further include allocating memory in a granular fashion to any of the first set of tenants such that each allocation of memory to a tenant includes memory addresses corresponding to a conflict set having a conflict set size. The conflict set may include a first conflicting region associated with the first swappable range of memory addresses associated with the near memory and a second conflicting region associated with the second swappable range of memory addresses associated with the far memory, and where each of the first conflicting region and the second conflicting region having a same size that is selected to be equal to or less than half of the conflict set size.

In addition, the present disclosure relates to a method including provisioning a compute node with both near memory and far memory, where a host operating system (OS) associated with the compute node is granted access to a first system address map configuration and a second system address map configuration different from the first system address map configuration. The method may further include granting to the host OS, configured to support a first set of tenants, access to a first non-swappable address range associated with the near memory.

The method may further include granting to the host OS, configured to support a second set of tenants, different from the first set of tenants, access to: (1) a first swappable address range associated with the near memory and (2) a second swappable address range associated with the far memory to allow for swapping of cache lines between the near memory and the far memory. The method may further include increasing a size of the first non-swappable address range by switching from the first system address map configuration to the second system address map configuration.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

FIG. 12 shows a flow chart of another example method for direct swap caching with noisy neighbor mitigation.

DETAILED DESCRIPTION

Figure 1:
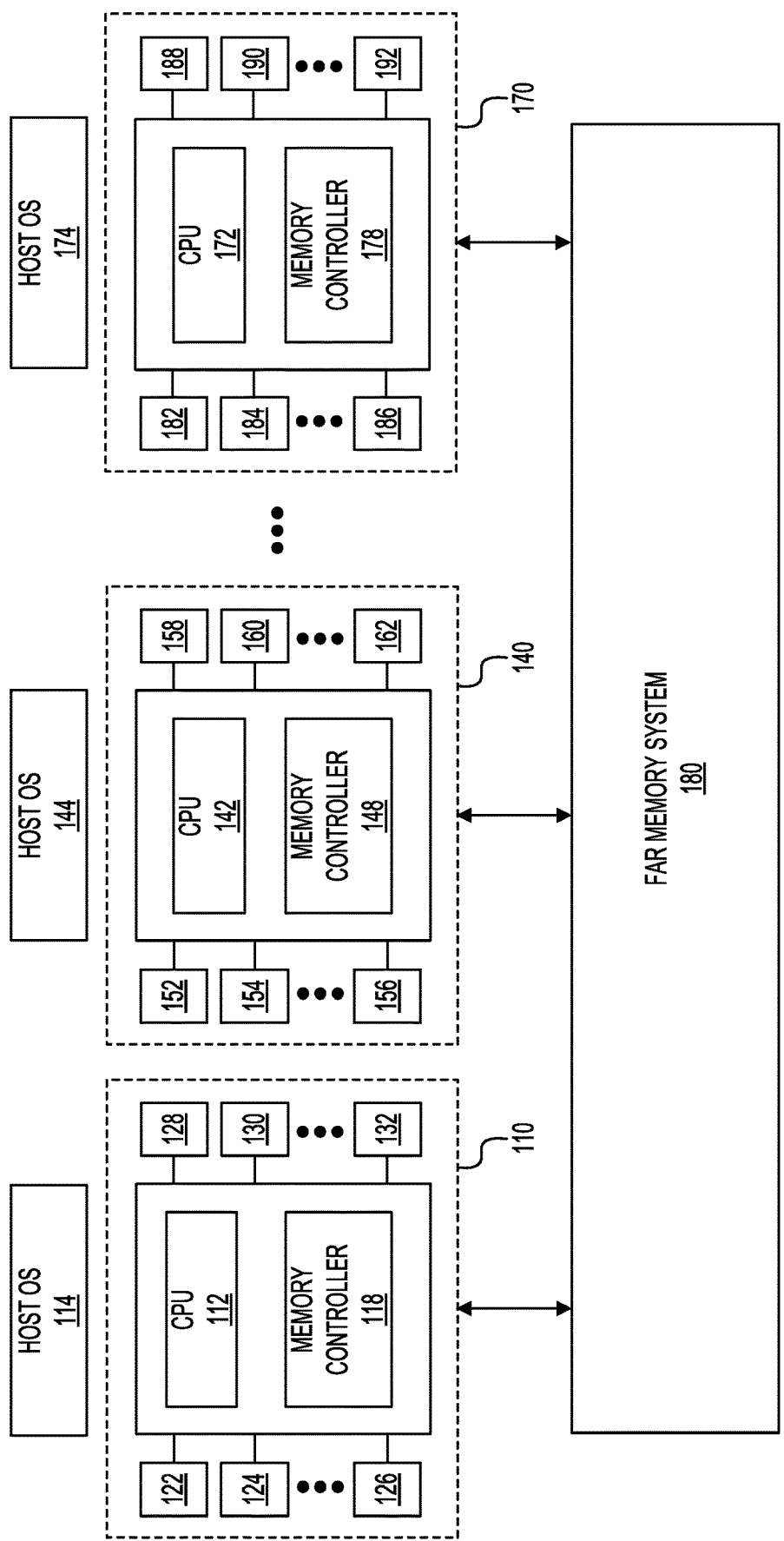
FIG. 1 is a block diagram of a system including compute nodes coupled with a far memory system in accordance with one example.

Examples described in this disclosure relate to systems and methods direct swap caching with noisy neighbor mitigation and dynamic address range assignment. Certain examples relate to leveraging direct swap caching for use with a host operating system (OS) in a computing system or a multi-tenant computing system. The multi-tenant computing system may be a public cloud, a private cloud, or a hybrid cloud. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Compute entities may be executed using compute and memory resources of the data center. As used herein, the term "compute entity" encompasses, but is not limited to, any executable code (in the form of hardware, firmware, software, or in any combination of the foregoing) that implements a functionality, a virtual machine, an application, a service, a micro-service, a container, or a unikernel for serverless computing. Alternatively, compute entities may be executing on hardware associated with an edge-compute device, on-premises servers, or other types of systems, including communications systems, such as base stations (e.g., 5G or 6G base stations).

Consistent with the examples of the present disclosure, a host OS may have access to a combination of near memory (e.g., the local DRAM) and an allocated portion of a far memory (e.g., pooled memory or non-pooled memory that is at least one level removed from the near memory). The far memory may relate to memory that includes any physical memory that is shared by multiple compute nodes. As an example, the near memory may correspond to double data rate (DDR) dynamic random access memory (DRAM) that operates at a higher data rate (e.g., DDR2 DRAM, DDR3 DRAM, DDR4 DRAM, or DDR5 DRAM) and the far memory may correspond to DRAM that operates at a lower data rate (e.g., DRAM or DDR DRAM). Other cost differences may be a function of the reliability or other differences in quality associated with the near memory versus the far memory. As used herein the term "near memory" and "far memory" are to be viewed in relative terms. Thus, near memory includes any memory that is used for storing any data or instructions that is evicted from the system level cache(s) associated with a CPU and the far memory includes any memory that is used for storing any data or instruction swapped out from the near memory. Another distinction between the near memory and the far memory relates to the relative number of physical links between the CPU and the memory. As an example, assuming the near memory is coupled via a near memory controller, thus being at least one physical link away from the CPU, the far memory is coupled to a far memory controller, which is at least one more physical link away from the CPU.

FIG. 1 is a block diagram of a system 100 including compute nodes 110, 140, and 170 coupled with a far memory system 180 in accordance with one example. Each compute node may include compute and memory resources. As an example, compute node 110 may include a central processing unit (CPU) 112; compute node 140 may include a CPU 142; and compute node 170 may include a CPU 172. Although each compute node in FIG. 1 is shown is having a single CPU, each compute node may include additional CPUs, and other devices, such as graphics processor units (GPUs), field programmable gate arrays (FPGAs), application specific integrated circuits (ASICs), or other devices. In addition, each compute node may include near memory, which may be organized as memory modules. As an example, compute node 110 may include memory modules 122, 124, 126, 128, 130, and 132. Compute node 140 may include memory modules 152, 154, 156, 158, 160, and 162. Compute node 170 may include memory modules 182, 184, 186, 188, 190, and 192. Examples of such memory modules include, but are not limited to, dual-in-line memory modules (DIMMs) or single-in-line memory modules (SIMMs). Memory included in these modules may be dynamic random access memory (DRAM), flash memory, static random access memory (SRAM), phase change memory, magnetic random access memory, or any other type of memory technology that can allow the memory to act as local memory.

With continued reference to FIG. 1, each compute node may include one or more memory controllers. As an example, compute node 110 may include memory controller 118, compute node 140 may include memory controller 148, and compute node 170 may include memory controller 178. The memory controller included in such nodes may be a double dynamic rate (DDR) DRAM controller in case the memory modules include DDR DRAM. Each compute node may be configured to execute several compute entities. In this example, compute node 110 may have host OS 114 installed on it; compute node 140 may have host OS 144 installed on it, and compute node 170 may have host OS 174 installed on it. Far memory system 180 may include pooled memory (or non-pooled memory), which may include several memory modules. Examples of such memory modules include, but are not limited to, dual-in-line memory modules (DIMMs) or single-in-line memory modules (SIMMs). Memory included in these modules may be dynamic random access memory (DRAM), flash memory, static random access memory (SRAM), phase change memory, magnetic random access memory, or any other type of memory technology that can allow the memory to act as far memory.

Any of host OS (e.g., host OS 114, 144, or 174), being executed by any of compute nodes (e.g., compute node 110, 140, or 170), may access at least a portion of the physical memory included as part of far memory system 180. A portion of memory from far memory system 180 may be allocated to the compute node when the compute node powers on or as part of allocation/deallocation operations. The assigned portion may include one or more "slices" of memory, where a slice refers to any smallest granularity of portions of memory managed by the far memory controller (e.g., a memory page or any other block of memory aligned to a slice size). A slice of memory is allocated at most to only one host at a time. Any suitable slice size may be used, including 1 GB slices, 2 GB slices, 8 GB slices, or any other suitable slice sizes. The far memory controller may assign or revoke assignment of slices to compute nodes based on an assignment/revocation policy associated with far memory system 180. As explained earlier, the data/instructions associated with a host OS may be swapped in and out of the near memory from/to the far memory.

In one example, compute nodes 110, 140, and 170 may be part of a data center. As used in this disclosure, the term data center may include, but is not limited to, some or all of the data centers owned by a cloud service provider, some or all of the data centers owned and operated by a cloud service provider, some or all of the data centers owned by a cloud service provider that are operated by a customer of the service provider, any other combination of the data centers, a single data center, or even some clusters in a particular data center. In one example, each cluster may include several identical compute nodes. Thus, a cluster may include compute nodes including a certain number of CPU cores and a certain amount of memory. Instead of compute nodes, other types of hardware such as edge-compute devices, on-premises servers, or other types of systems, including communications systems, such as base stations (e.g., 5G or 6G base stations) may also be used. Although FIG. 1 shows system 100 as having a certain number of components, including compute nodes and memory components, arranged in a certain manner, system 100 may include additional or fewer components, arranged differently.

Figure 2:
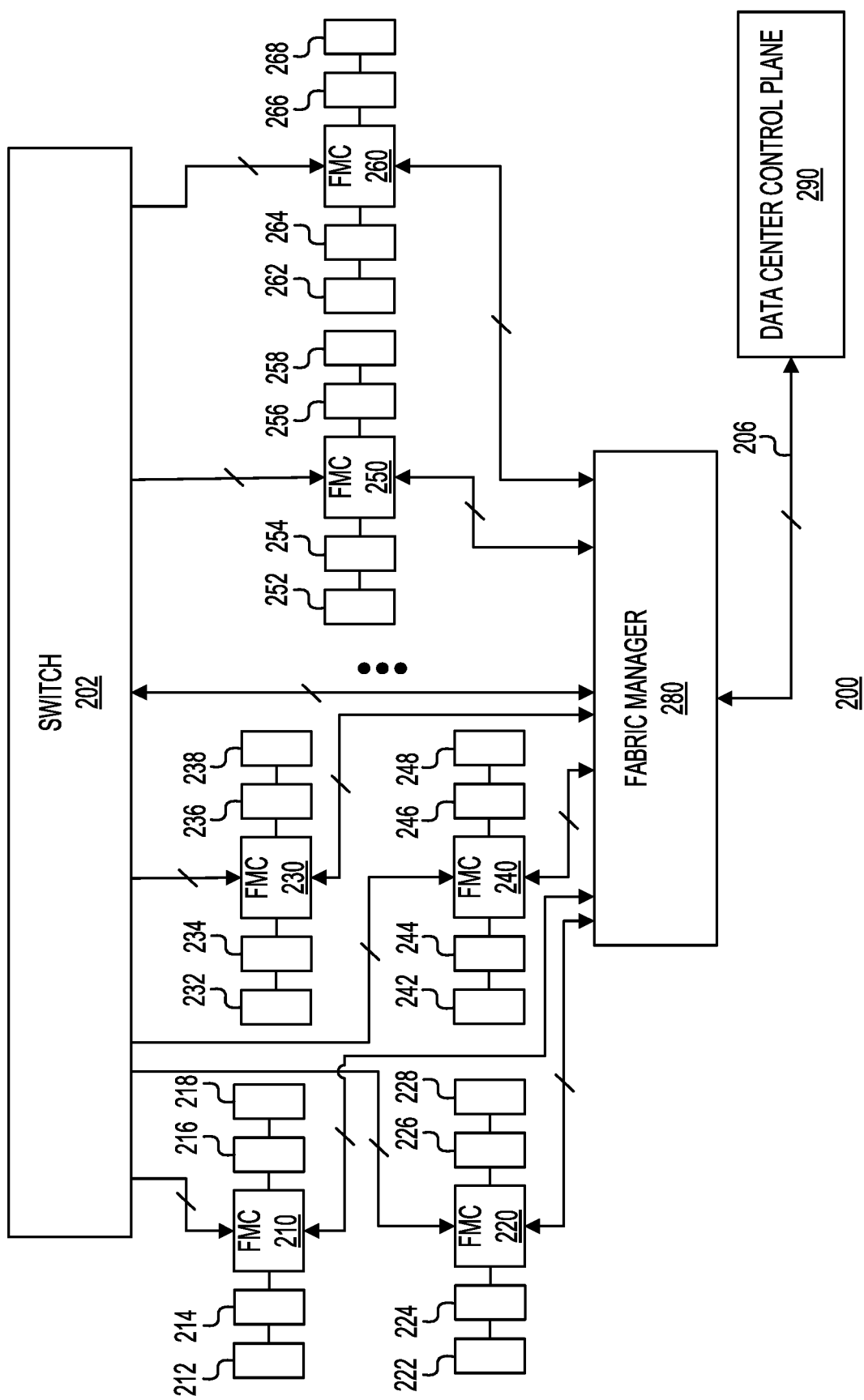
FIG. 2 shows a block diagram of an example far memory system.

FIG. 2 shows a block diagram of an example far memory system 200 corresponding to far memory system 180 shown in FIG. 1. Far memory system 200 may include a switch 202 for coupling the far memory system controllers to compute nodes (e.g., compute nodes 110, 130, and 150 of FIG. 1). Far memory system 200 may further include several far memory controllers and associated far memory modules. As an example, far memory system 200 may include far memory controller (FMC) 210, FMC 220, FMC 230, FMC 240, FMC 250, and FMC 260 coupled to switch 202, as shown in FIG. 2. Each of FMC 210, FMC 220, FMC 230, FMC 240, FMC 250, and FMC 260 may further be coupled to fabric manager 280. FMC 210 may further be coupled to memory modules 212, 214, 216, and 218. FMC 220 may further be coupled to memory modules 222, 224, 226, and 228. FMC 230 may further be coupled to memory modules 232, 234, 236, and 238. FMC 240 may further be coupled to memory modules 242, 244, 246, and 248. FMC 250 may further be coupled to memory modules 252, 254, 256, and 258. FMC 260 may further be coupled to memory modules 262, 264, 266, and 268. Each memory module may be a dual-in-line memory module (DIMM) or a single-in-line memory module (SIMM).

With continued reference to FIG. 2, in one example, each of the far memory controllers may be implemented as a Compute Express Link (CXL) specification compliant memory controller. In this example, each of the memory modules associated with far memory system 200 may be configured as Type 3 CXL devices. Fabric manager 280 may communicate via bus 206 with data center control plane 290. In one example, fabric manager 280 may be implemented as a CXL specification compliant fabric manager. Control information received from data center control plane 290 may include control information specifying which slices of memory from the far memory are allocated to any particular compute node at a given time. In response to this control information, fabric manager 280 may allocate a slice of memory from within the far memory to a specific compute node in a time-division multiplexed fashion. In other words, at a time a particular slice of memory could only be allocated to a specific compute node and not to any other compute nodes. As part of this example, transactions associated with CXL.io protocol, which is a PCIe-based non-coherent I/O protocol, may be used to configure the memory devices and the links between the CPUs and the memory modules included in far memory system 200. The CXL.io protocol may also be used by the CPUs associated with the various compute nodes in device discovery, enumeration, error reporting, and management. Alternatively, any other I/O protocol that supports such configuration transactions may also be used. The memory access to the memory modules may be handled via the transactions associated with CXL.mem protocol, which is a memory access protocol that supports memory transactions. As an example, load instructions and store instructions associated with any of the CPUs may be handled via CXL.mem protocol. Alternatively, any other protocols that allow the translation of the CPU load/store instructions into read/write transactions associated with memory modules included in far memory system 200 may also be used. Although FIG. 2 shows far memory system 200 as having a certain number of components, including far memory controllers and memory modules, arranged in a certain manner, far memory system 200 may include additional or fewer components, arranged differently. As an example, the far memory may be implemented as memory modules that are coupled in the same manner as the near memory (e.g., memory modules shown as part of system 100 in FIG. 1). The far memory modules, however, may be implemented using cheaper or lower speed versions of the memory.

Figure 3:
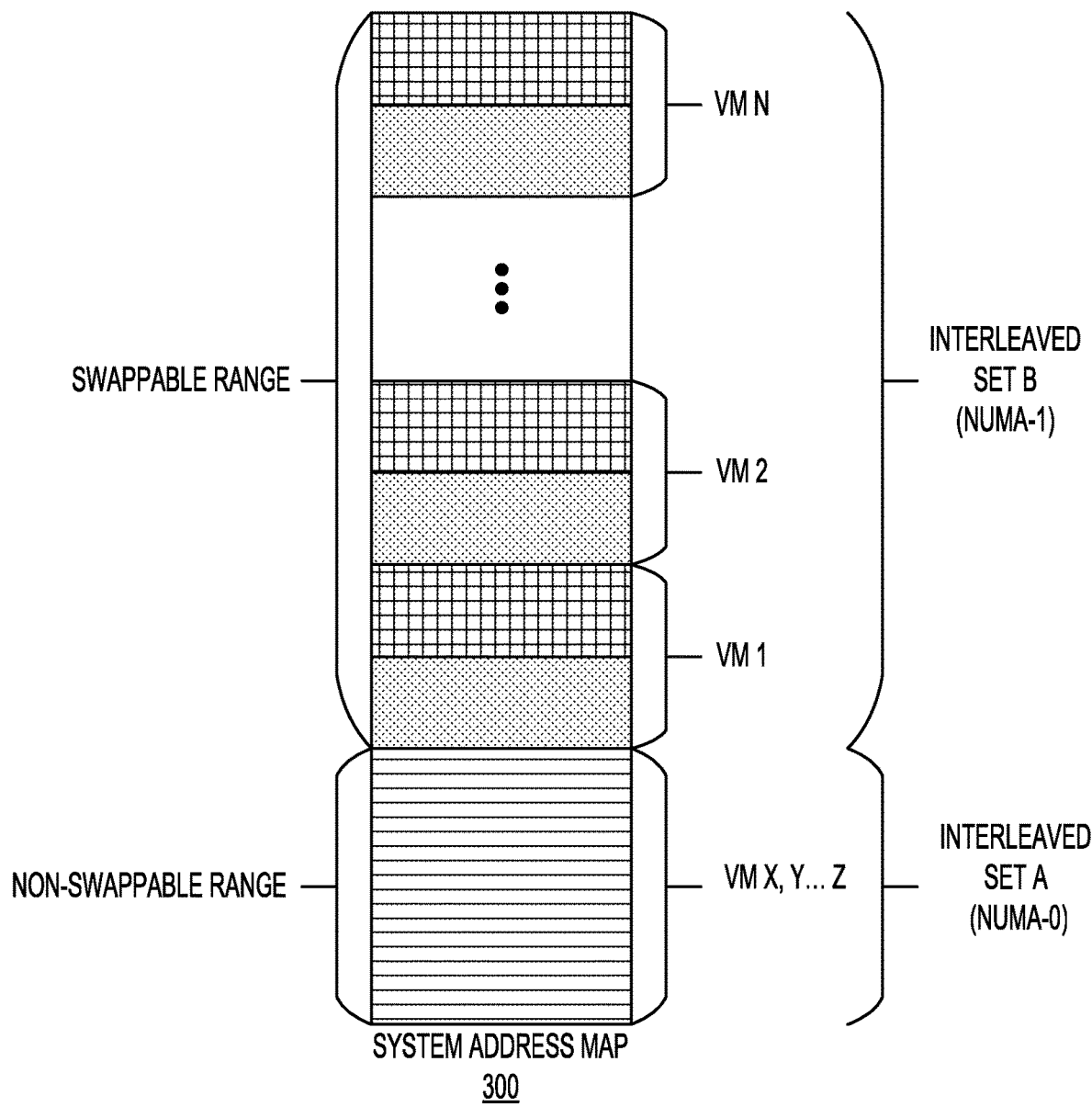
FIG. 3 shows an example system address map for use with the system of FIG. 1.

FIG. 3 shows an example system address map 300 for use with the system 100 of FIG. 1. In this example, in order to use direct swap caching in the context of system 100 of FIG. 1, the near memory must have a fixed ratio with the far memory. In this example, it is assumed that near memory includes both a non-swappable range and a swappable range. This means that in this example any access to memory within the non-swappable range will be guaranteed to get a "hit" in the near memory (since this range is not being swapped). Any access to a location in memory within the swappable range will operate in the direct swap cache manner. Thus, these accesses will first perform a lookup within the memory designated as the near memory. A hit in the near memory will be serviced directly out of the local memory, whereas a miss in the near memory will cause a swap operation between the corresponding far memory and near memory locations. Swapping operations (e.g., swapping data from the locations in the far memory into the locations in the near memory or swapping data out from the locations in the near memory into the locations in the far memory) may be performed at a granularity level of a cache line. Each cache line may include a combination of a data portion (e.g., 512 bits) and a metadata portion (e.g., 128 bits). The data portion may contain data representing user data or instructions executed by a compute node. The metadata portion may include data representing various attributes of the data in the data portion. The metadata portion can also include error checking and correction bits or other suitable types of information. In addition, the metadata portion may include a tag having an appropriate number of bit(s) to distinguish between the location of a cache line. In this example, since the swappable memory region in the near memory has the same size as the swappable memory region in the far memory (a ratio of 1), a single bit may be used. Thus, a logical value of "1" may indicate that the cache line is in a location corresponding to the near memory whereas a logical value of "0" may indicate that the cache line is in a location corresponding to the far memory. The present disclosure, however, is not limited to the use of a fixed ratio of 1:1 between the near memory and the far memory. As an example, a ratio of 1:3 may be used. In such a case, additional tag bits may be required to encode the information concerning the location of the cache line in terms of the region of the memory having the cache line.

With continued reference to FIG. 3, one of the potential issues that can occur with respect to direct swap caching is that conflicting cache lines in near-memory may be allocated to separate tenants (e.g., VMs, containers, etc.) in a virtualized system. In such a scenario, one tenant's swapping of cache lines can impact the memory bandwidth and the memory capacity of another tenant. The present disclosure describes an example mechanism that allows one to build isolation between tenants such that one tenant cannot impact the memory bandwidth and the memory capacity of another tenant. To that end, the present disclosure describes an address mapping arrangement such that conflict sets map to the same tenant—that is, one tenant's addresses do not conflict with another.

System address map 300 includes both swappable range and non-swappable range. In this example, an address bit is used to carve up the swappable range into smaller granular regions. As an example, assuming 2 terabytes (TB) of memory range is available for use with system address map 300, 1 TB is configured as a non-swappable range and 1 TB is configured as a swappable range. A low order address bit is used to carve this memory range (swappable range) into smaller granular regions, each having a size of 512 MB. In this arrangement, as long as a tenant (e.g., any of VM 1, VM 2, . . . VM N) is allocated an address range equal to or higher that 1 GB (at least twice the size of the smaller granular regions), then the tenants' addresses do not conflict with each other. The address range allocated to each tenant can be viewed as having a conflict set size (e.g., 1 GB), which in this example is selected to be of the same size as the page size associated with the system. The host OS (e.g., a hypervisor) can allocate memory to the tenants in 1 GB increments. Each 1 GB increment need not be contiguous. Each conflict set (having two conflicting 512 MB swappable regions) corresponds to a single 512 MB region in the physical memory accessible to a tenant (e.g., the DRAM). Thus, a single 1 GB page corresponds to a single 512 MB region in the physical memory. In this example, a low order address bit (e.g., address bit 29) can have a logical value of "0" or "1" to distinguish between the two 512 MB conflicting regions. When the logical value for the address bit 29 is "0," then the cache line's address corresponds to one of the 512 MB conflicting regions and when the logical value for the address bit 29 is "1," then the cache line's address corresponds to the other 512 MB conflicting region. Other types of encodings may also be used as part of the addressing to distinguish between the two conflicting regions.

Although the granularity of address allocation can be arbitrary, an interesting property of using the size of 512 MB is the following: if the first-level page tables (the tables that map the Guest Physical Address to the System Physical Address) use a 1 GB page size, then this method of carving up the address space may ensure perfect noisy-neighbor isolation even if the 1 GB pages are allocated in a discontiguous fashion across the system physical address (SPA) space.

Still referring to FIG. 3, system address map 300 also includes a non-swappable range. That range can be allocated to a set of high-priority tenants (e.g., VMs X, Y . . . Z) that use the non-swapped space that are also isolated from all the tenants using the swappable region prone to conflicts. This example further assumes that the compute node (e.g., the host server) is a two-socket server system that allows access to two non-uniform memory access (NUMA) sets: INTERLEAVED SET A (NUMA-0) and INTERLEAVED SET B (NUMA-1). These different sets can offer different NUMA characteristics to the tenants. As an example, the non-swappable range of system address map 300 can be mapped to the NUMA-0 set that allows for local access to memory that is faster relative to the NUMA-1 set. In one example, the swappable range and the non-swappable range can be advertised through the Advanced Configuration and Power Interface (ACPI) as two separate ranges. As noted earlier, each range can be mapped to memory with different NUMA characteristics. In addition, each of the swappable range and the non-swappable range can have different attributes as provided via the respective Heterogenous Memory Attributes Tables (HMATs).

Figure 4:
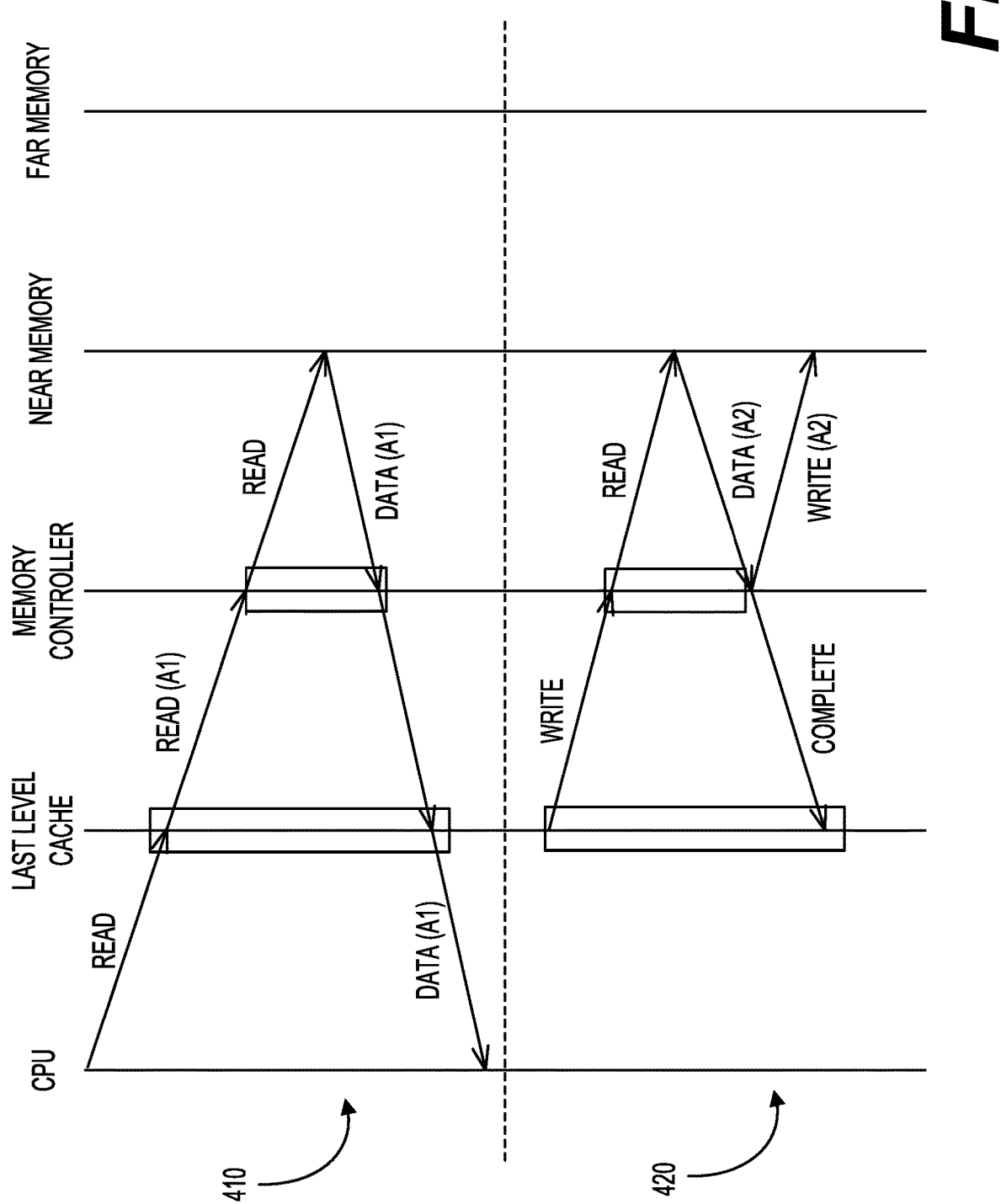
FIG. 4 is a diagram showing a transaction flow related to a read operation and a write operation when the location of the data is in the near memory in accordance with one example.

FIG. 4 is a diagram showing a transaction flow 400 related to a read operation and a write operation when the location of the data is in the near memory. The transactions associated with the read operation are shown in portion 410 of transaction flow 400 and the transactions associated with the write operation are shown in flow portion 420 of transaction flow 400. During a read operation, a CPU (e.g., any of CPUs 112, 142, or 172 of FIG. 1) can issue a command to a memory controller (e.g., any of memory controllers 118, 148, and 178 of FIG. 1) to read data corresponding to address A1. Upon the read operation resulting in a miss with respect to the last level cache, address A1 is first decoded to the near memory (e.g., any of the local memory associated with the CPU). The read from the local memory location results in a retrieval of a cache line including both the data portion and the metadata portion (including the tag). In this case, the tag indicates that the data portion corresponds to the address being looked up and hence it is a hit. As a result, the data in the cache line is returned to the requesting CPU. As shown in portion 420 of transaction flow 400, when a cache line is being written to the memory, every write operation needs to be preceded by a read operation to ensure that the memory location contains the address being written. In this case, the data is being written to address A2, which is located within the near memory and thus the write operation is also a hit.

Figure 5:
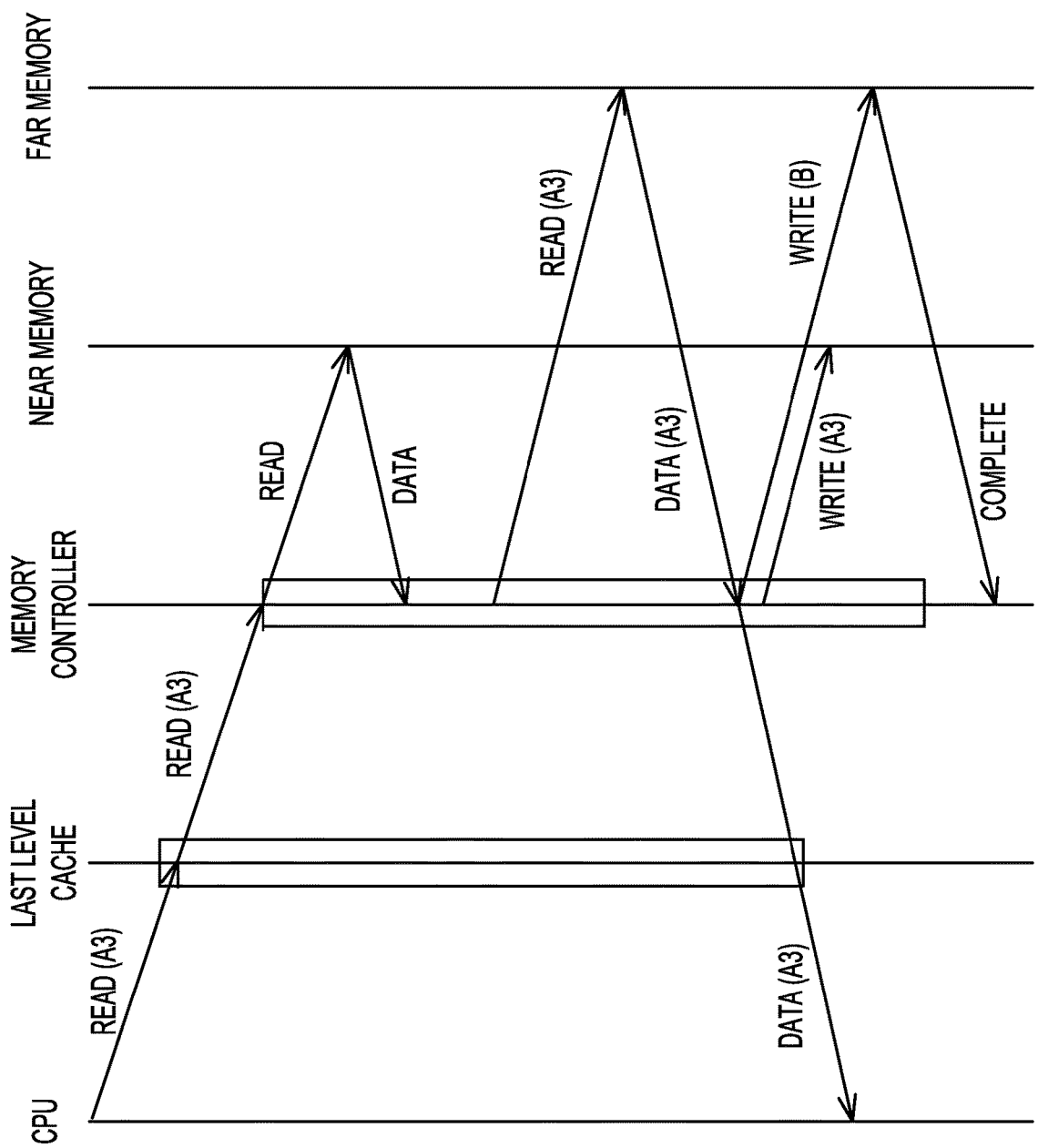
FIG. 5 is a diagram showing a transaction flow relating to the transactions that occur when the data associated with a read operation is located in the far memory in accordance with one example.

FIG. 5 is a diagram showing a transaction flow 500 relating to the transactions that occur when the data associated with a read operation is located in the far memory (e.g., the pooled memory). If the tag indicates that the near memory location does not contain the address of the data being requested, then it is a miss. Upon a miss, to prevent conflict and race conditions, a blocking entry may be set in the memory controller for the four entries that map to the memory location in the local memory. Next, the tag may be used to decode which location in the far memory contains the data corresponding to the address being requested. As described earlier, the far memory may be implemented as CXL compliant type 3 devices. In such an implementation, the memory controller may spawn a CXL.mem read request to the appropriate address. Once the data is retrieved, the data is sent to the original requester and thus completes the read operation. The data is also written to the near memory and the original data read from the local memory is written to the same location in the far memory from which the read happened—thereby performing the cache line swap.

Figure 6:
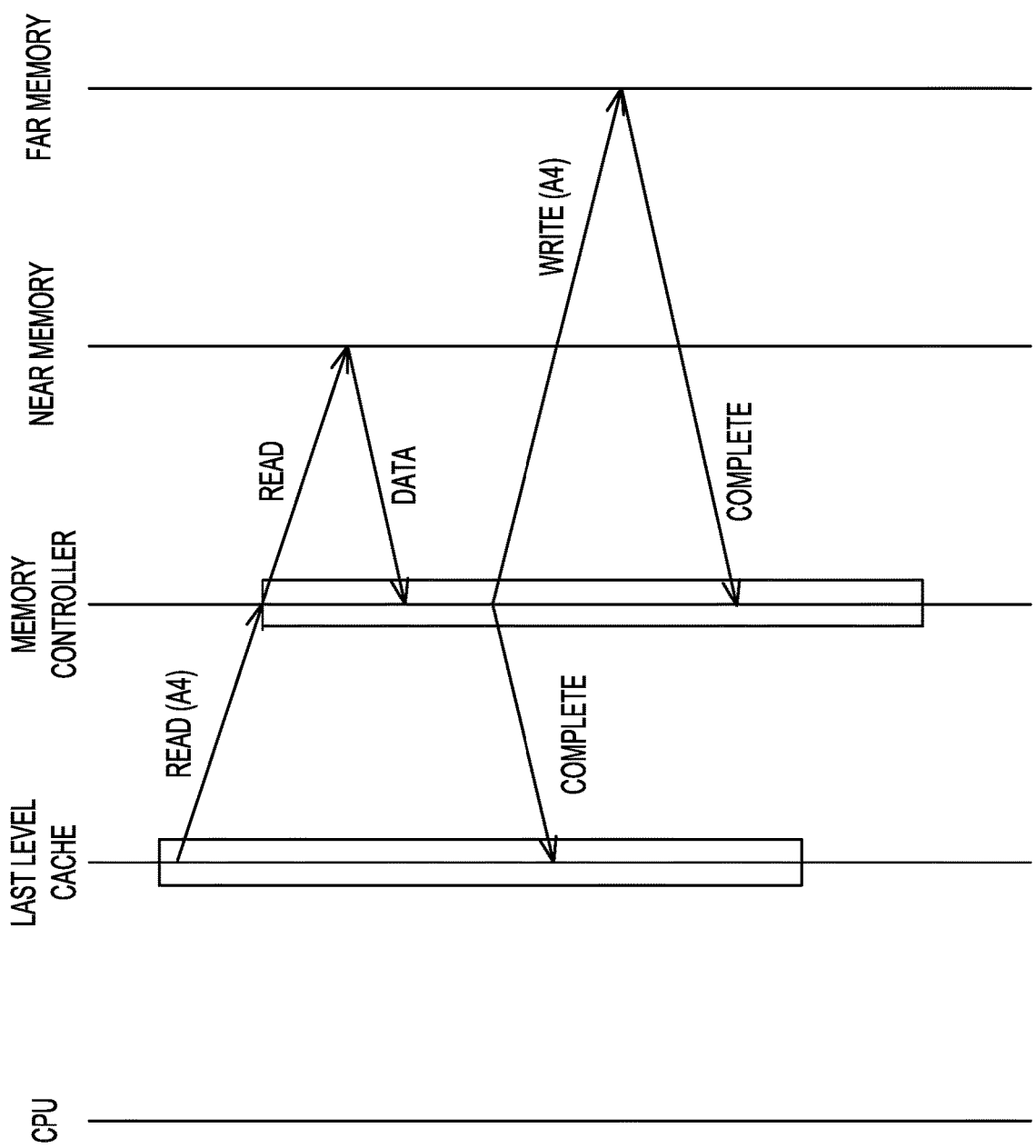
FIG. 6 is a diagram showing a transaction flow relating to the transactions that occur when the data associated with a write operation is located in the far memory in accordance with one example.

FIG. 6 is a diagram showing a transaction flow 600 relating to the transactions that occur when the data associated with a write operation is located in the far memory. For a write (e.g., write (A3)) that misses the near memory (local memory), the data is written to the far memory.

Figure 7:
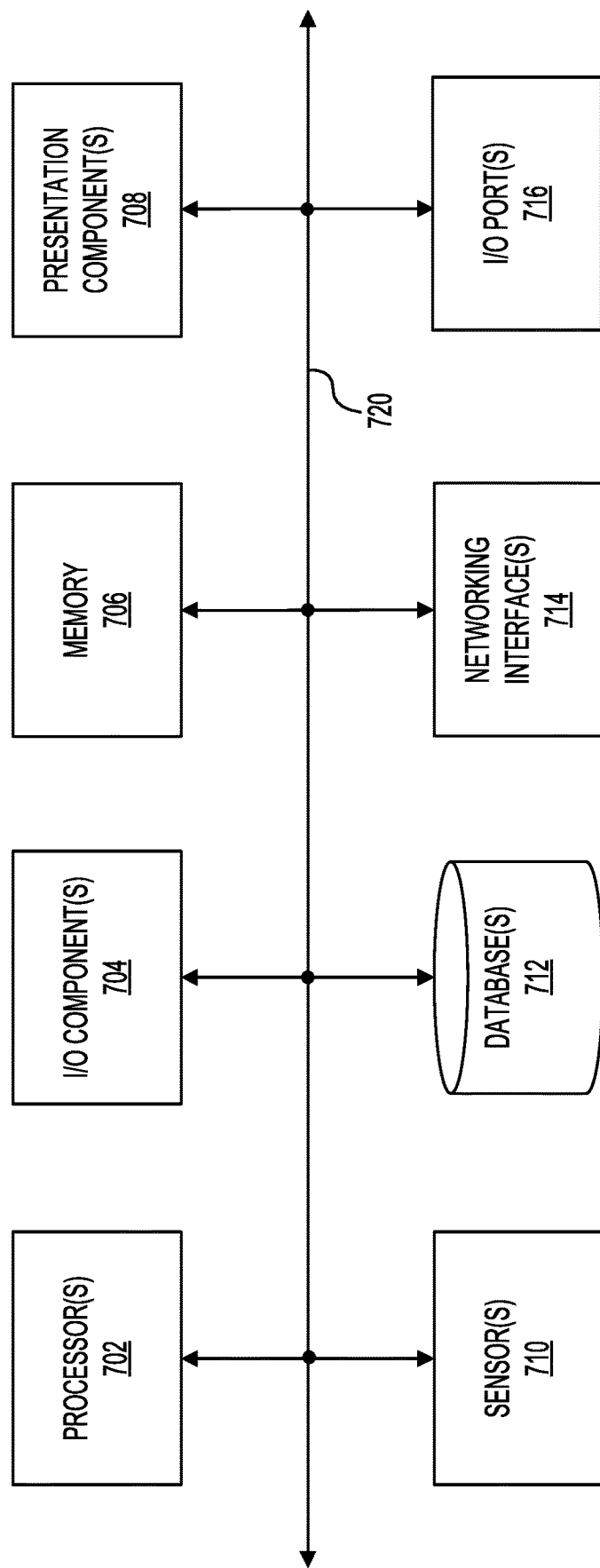
FIG. 7 shows a block diagram of an example system for implementing at least some of the methods for direct swap caching with noisy neighbor mitigation and dynamic address range assignment.

FIG. 7 shows a block diagram of an example system 700 for implementing at least some of the methods for integrated memory pooling and direct swap caching. System 700 may include processor(s) 702, I/O component(s) 704, memory 706, presentation component(s) 708, sensors 710, database(s) 712, networking interfaces 714, and I/O port(s) 716, which may be interconnected via bus 720. Processor(s) 702 may execute instructions stored in memory 706. I/O component(s) 704 may include components such as a keyboard, a mouse, a voice recognition processor, or touch screens. Memory 706 may be any combination of non-volatile storage or volatile storage (e.g., flash memory, DRAM, SRAM, or other types of memories). Presentation component(s) 708 may include displays, holographic devices, or other presentation devices. Displays may be any type of display, such as LCD, LED, or other types of display. Sensor(s) 710 may include telemetry or other types of sensors configured to detect, and/or receive, information (e.g., collected data). Sensor(s) 710 may include telemetry or other types of sensors configured to detect, and/or receive, information (e.g., memory usage by various compute entities being executed by various compute nodes in a data center). Sensor(s) 710 may include sensors configured to sense conditions associated with CPUs, memory or other storage components, FPGAs, motherboards, baseboard management controllers, or the like. Sensor(s) 710 may also include sensors configured to sense conditions associated with racks, chassis, fans, power supply units (PSUs), or the like. Sensor(s) 710 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

Still referring to FIG. 7, database(s) 712 may be used to store any of the data collected or logged and as needed for the performance of methods described herein. Database(s) 712 may be implemented as a collection of distributed databases or as a single database. Network interface(s) 714 may include communication interfaces, such as Ethernet, cellular radio, Bluetooth radio, UWB radio, or other types of wireless or wired communication interfaces. I/O port(s) 716 may include Ethernet ports, Fiber-optic ports, wireless ports, or other communication or diagnostic ports. Although FIG. 7 shows system 700 as including a certain number of components arranged and coupled in a certain way, it may include fewer or additional components arranged and coupled differently. In addition, the functionality associated with system 700 may be distributed, as needed.

Figure 8:
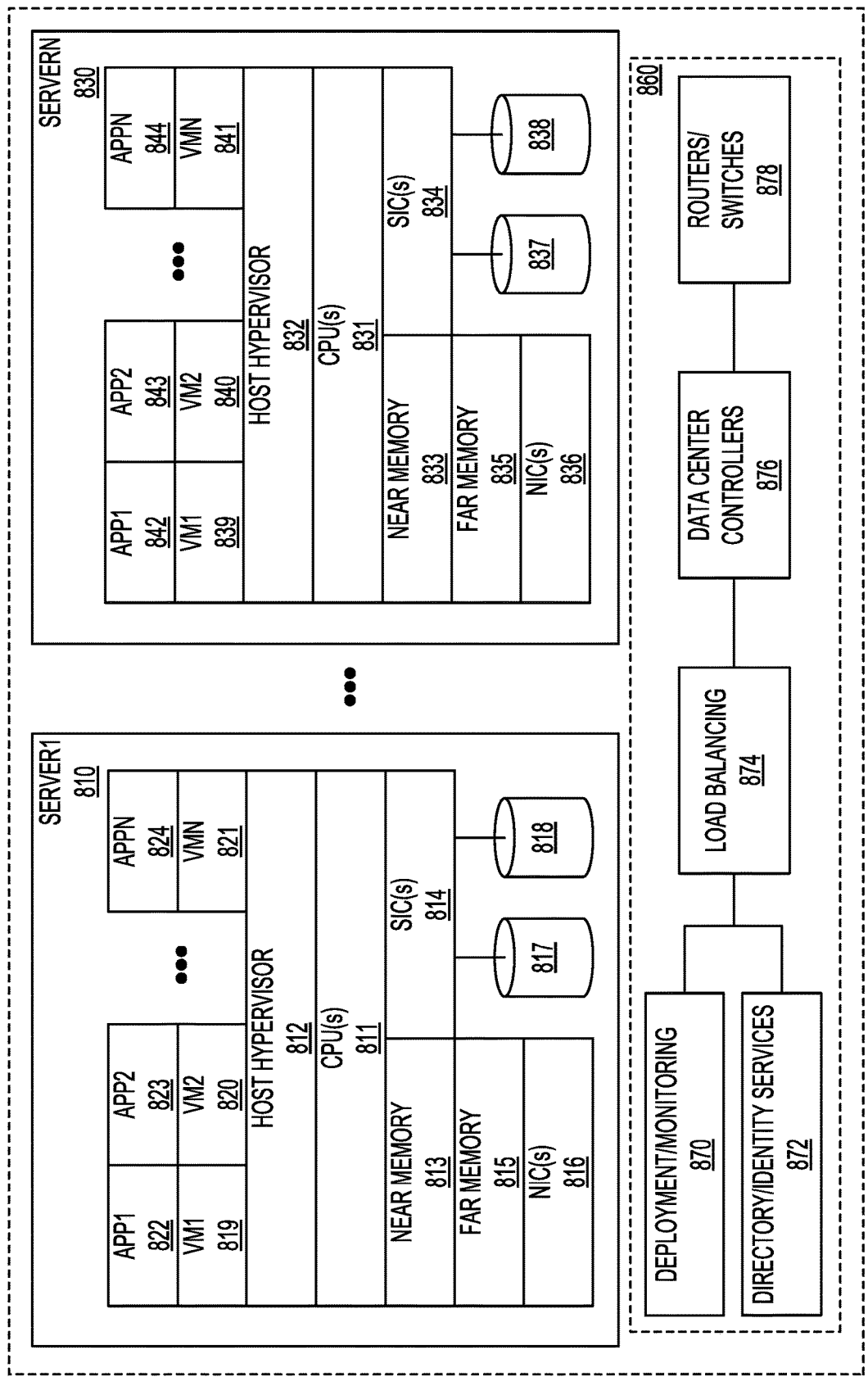
FIG. 8 shows a data center for implementing a system for direct swap caching with noisy neighbor mitigation and dynamic address range assignment.

FIG. 8 shows a data center 800 for implementing a system for direct swap caching with noisy neighbor mitigation and dynamic address range assignment in accordance with one example. As an example, data center 800 may include several clusters of racks including platform hardware, such as compute resources, storage resources, networking resources, or other types of resources. Compute resources may be offered via compute nodes provisioned via servers that may be connected to switches to form a network. The network may enable connections between each possible combination of switches. Data center 800 may include server1 810 and serverN 830. Data center 800 may further include data center related functionality 860, including deployment/monitoring 870, directory/identity services 872, load balancing 874, data center controllers 876 (e.g., software defined networking (SDN) controllers and other controllers), and routers/switches 878. Server1 810 may include CPU(s) 811, host hypervisor 812, near memory 813, storage interface controller(s) (SIC(s)) 814, far memory 815, network interface controller(s) (NIC(s)) 816, and storage disks 817 and 818. As explained earlier, memory 815 may be implemented as a combination of near memory and far memory. ServerN 830 may include CPU(s) 831, host hypervisor 832, near memory 833, storage interface controller(s) (SIC(s)) 834, far memory 835, network interface controller(s) (NIC(s)) 836, and storage disks 837 and 838. As explained earlier, memory 835 may be implemented as a combination of near memory and far memory. Server1 810 may be configured to support virtual machines, including VM1 819, VM2 820, and VMN 821. The virtual machines may further be configured to support applications, such as APP1 822, APP2 823, and APPN 824. ServerN 830 may be configured to support virtual machines, including VM1 839, VM2 840, and VMN 841. The virtual machines may further be configured to support applications, such as APP1 842, APP2 843, and APPN 844.

With continued reference to FIG. 8, in one example, data center 800 may be enabled for multiple tenants using the Virtual eXtensible Local Area Network (VXLAN) framework. Each virtual machine (VM) may be allowed to communicate with VMs in the same VXLAN segment. Each VXLAN segment may be identified by a VXLAN Network Identifier (VNI). Although FIG. 8 shows data center 800 as including a certain number of components arranged and coupled in a certain way, it may include fewer or additional components arranged and coupled differently. In addition, the functionality associated with data center 800 may be distributed or combined, as needed.

Figure 9:
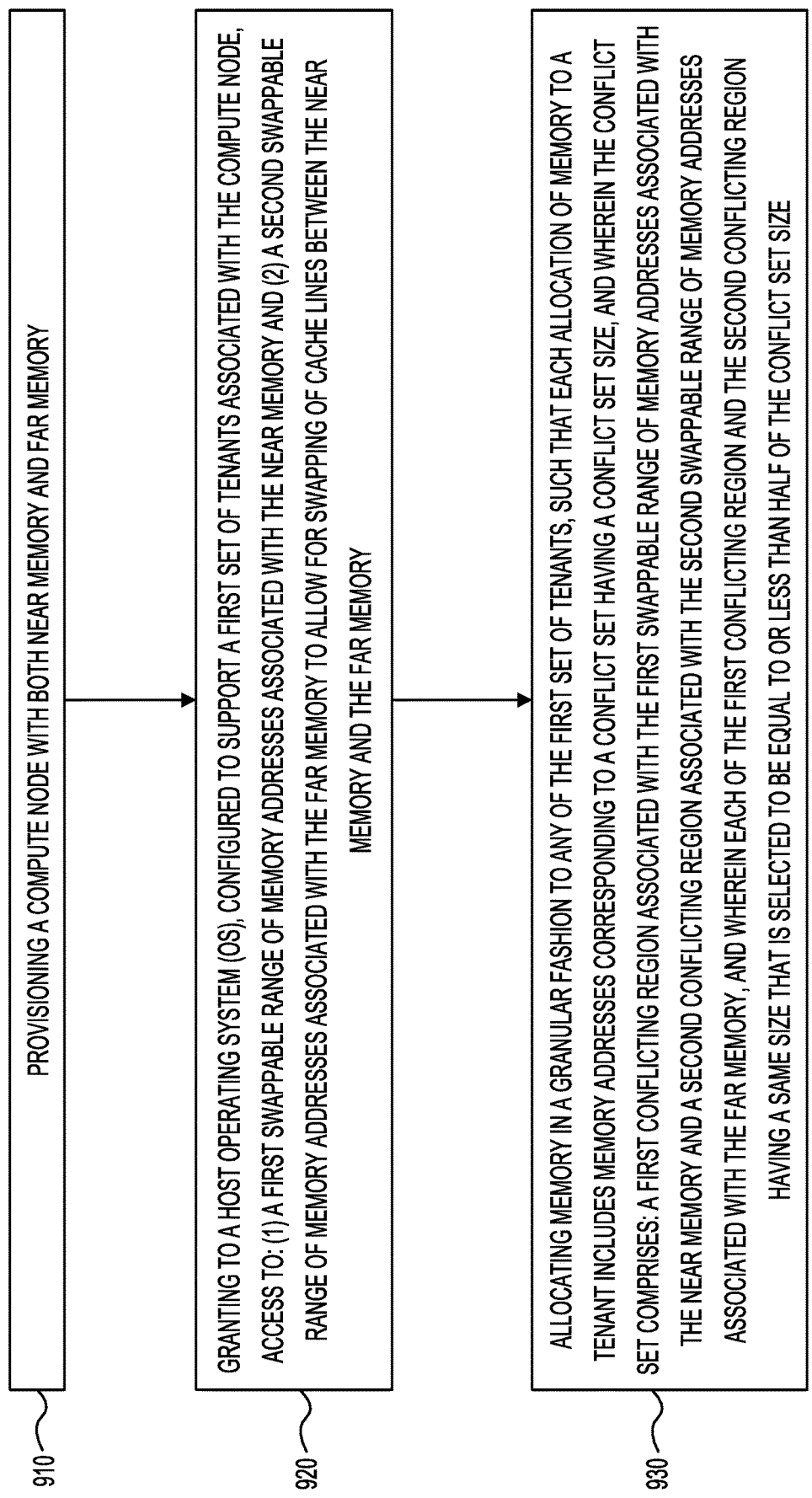
FIG. 9 shows a flow chart of an example method for direct swap caching with noisy neighbor mitigation.

FIG. 9 shows a flow chart 900 of an example method for direct swap caching with noisy neighbor mitigation. In one example, steps associated with this method may be executed by various components of the systems described earlier (e.g., system 100 of FIG. 1 and system 200 of FIG. 2). Step 910 may include provisioning a compute node with both near memory and far memory.

Step 920 may include granting to a host operating system (OS), configured to support a first set of tenants associated with the compute node, access to: (1) a first swappable range of memory addresses associated with the near memory and (2) a second swappable range of memory addresses associated with the far memory to allow for swapping of cache lines between the near memory and the far memory. As explained earlier, with respect to FIG. 3, assuming 2 terabytes (TB) of memory range is available for use with system address map 300, 1 TB is configured as a non-swappable range and 1 TB is configured as a swappable range. A low order address bit may be used to carve this swappable range into smaller granular regions, each having a size of 512 MB.

Step 930 may include allocating memory in a granular fashion to any of the first set of tenants such that each allocation of memory to a tenant includes memory addresses corresponding to a conflict set having a conflict set size, and where the conflict set comprises: a first conflicting region associated with the first swappable range of memory addresses associated with the near memory and a second conflicting region associated with the second swappable range of memory addresses associated with the far memory, and where each of the first conflicting region and the second conflicting region having a same size that is selected to be equal to or less than half of the conflict set size. As explained earlier with respect to the arrangement shown in FIG. 3, as long as a tenant (e.g., any of VM 1, VM 2, . . . VM N) is allocated an address range equal to or higher that 1 GB (at least twice the size of the conflicting regions), then the tenants' addresses do not conflict with each other. The address range allocated to each tenant can be viewed as having a conflict set size (e.g., 1 GB), which in this example is selected to be of the same size as the page size associated with the system. Advantageously, having the conflict set size being the same size as the page size associated with the system may result in the highest quality of service possible with respect to memory operations (e.g., read/write operations). The host OS (e.g., a hypervisor) can allocate memory to the tenants in 1 GB increments. Each 1 GB increment need not be contiguous. Each conflict set (having two conflicting 512 MB swappable regions) corresponds to a single 512 MB region in the physical memory accessible to a tenant (e.g., the DRAM). Thus, a single 1 GB page corresponds to a single 512 MB region in the physical memory. In this example, a low order address bit (e.g., address bit 29) can have a logical value of "0" or "1" to distinguish between the two 512 MB conflicting regions. When the logical value for the address bit 29 is "0" then the cache line is in one of the 512 MB conflicting regions and when the logical value for the address bit 29 is "1" then the cache line is in the other 512 MB conflicting regions.

As shown earlier with respect to FIG. 3, the host OS can have initial access to a certain size of swappable range of memory addresses and a certain size of non-swappable range of memory addresses. Traditionally, any changes to this initial allocation have required modifications to hardware registers that may be programmed as part of the firmware associated with the boot sequence of the compute node. As an example, the basic input-output system (BIOS) associated with the system (e.g., a system including a compute node) may set up the hardware registers based on firmware settings. The host OS does not have access to the hardware registers. Accordingly, the host OS cannot change the system address map. Typically, any modifications to such hardware registers would require reprogramming of the firmware (e.g., the BIOS firmware). Reprogramming of the firmware, or other hardware, necessitates rebooting the compute node. This in turn deprives the tenants of the access to the compute node during the time that the compute node is being reprogrammed and restarted. The present disclosure describes techniques to change the initial allocation of the size of the swappable region and the non-swappable region without requiring reprogramming of the hardware registers. In sum, this is accomplished by provisioning any number of different configurations and then switching between the configurations, as required, without having to reprogram the hardware registers. Advantageously, the switching between the configurations provides run-time flexibility with respect to the type of workloads that can be run using the system. As an example, initially the host OS for a system may have an equal amount of swappable and non-swappable range of addresses. The non-swappable range of addresses may be allocated to a set of high-priority tenants (e.g., VMs X, Y . . . Z) that use the non-swapped space and thus, are also isolated from all the tenants using the swappable region prone to conflicts. If, during runtime, the host OS discovers a higher demand for memory usage from the high-priority tenants, then the host OS may make a runtime switch to a different configuration of a system address map that includes a larger amount of non-swappable address space. If, however, the demand pattern is the reverse of this example, then the host OS may make a runtime switch to yet another configuration of a system address map that includes a larger amount of swappable address space.

Figure 10:
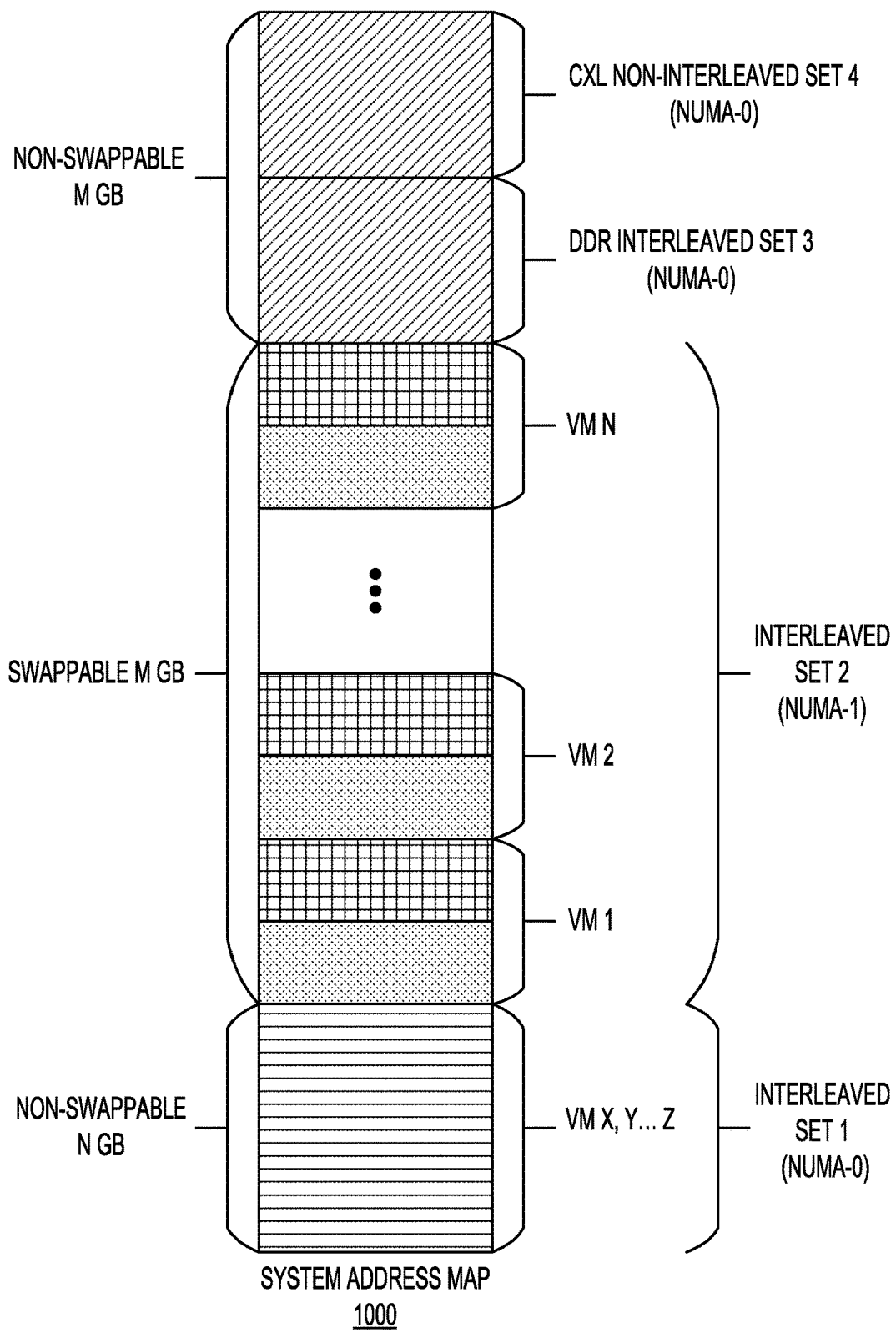
FIG. 10 shows configuration A of a system address map for use with the system of FIG. 1.

FIG. 10 shows a configuration A of a system address map 1000 for use with system 100 of FIG. 1. The configuration A described with respect to system address map 1000 assumes a non-swappable range of N gigabytes (GB) and a swappable range of M GB. A low order address bit is used to carve the swappable range into smaller granular regions (e.g., each having a size of 512 MB). These granular regions can be allocated to the tenants (e.g., any of VM 1, VM 2, . . . VM N). The non-swappable range can be allocated to tenants having a higher priority (e.g., any of VM X, Y, and Z). This example further assumes that the compute node (e.g., the host server) is a two-socket server system that allows access to two non-uniform memory access (NUMA) sets: INTERLEAVED SET A (NUMA-0) and INTERLEAVED SET B (NUMA-1). These different sets can offer different NUMA characteristics to the tenants. As an example, the non-swappable range of system address map 1000 can be mapped to the NUMA-0 set that allows for local access to memory that is faster relative to the NUMA-1 set.

With continued reference to FIG. 10, as part of this configuration, in addition to the swappable range of N GB and the swappable range of M GB, system address map 1000 is further used to reserve two M/2 GB non-swappable address ranges. One of the M/2 GB non-swappable address ranges is mapped to near memory (e.g., DDR INTERLEAVED SET 3) and the other M/2 non-swappable address range is mapped to the far memory (e.g., CXL NON-INTERLEAVED SET 4). Hardware registers (e.g., hardware address decoders) associated with the compute node are set up such that each of the M/2 GB address ranges are mapping to the same near memory (e.g., the DRAM) locations. As such, these address ranges are reserved initially and are indicated to the host OS as unavailable. Thus, in the beginning, these two address ranges are marked as offline. As such, the address ranges marked as reserved are not mapped to any physical memory. Accordingly, in the beginning the host OS can only access the N GB non-swappable range and the M GB swappable range. Assuming, at a later time, the ratio of the swappable range to the non-swappable range requires a change such that there is a need for an additional X GB of non-swappable range that is accessible to the host OS. To accomplish this, system address map 1000 is switched from the configuration A shown in FIG. 10 to the configuration B shown in FIG. 11

Figure 11:
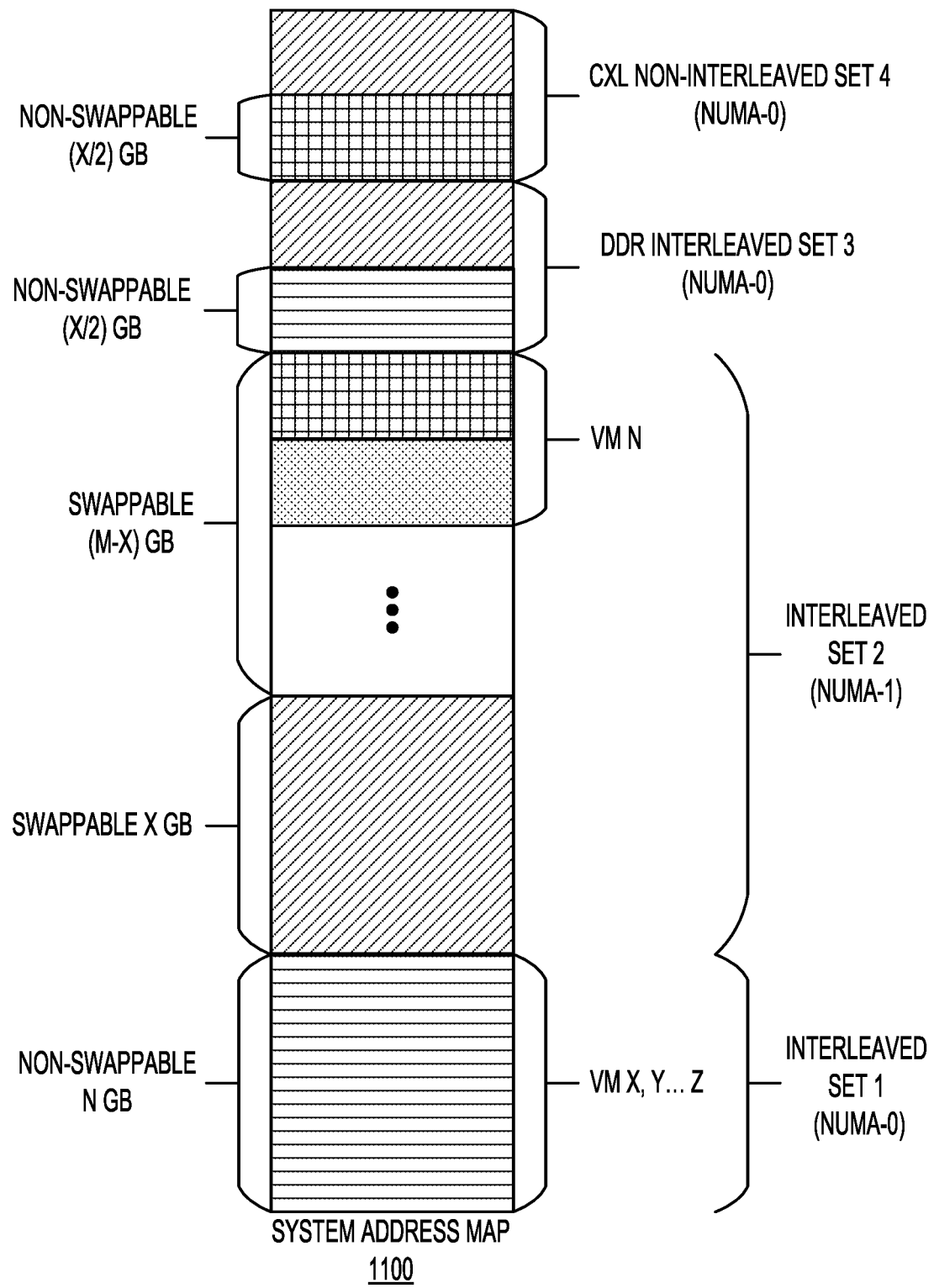
FIG. 11 shows configuration B of a system address map for use with the system of FIG. 1.

With continued reference to FIG. 11, the switch to configuration B is accomplished by the host OS without invoking the BIOS, including without any reprogramming of the hardware registers. The host OS takes X GB of the swappable range offline. Prior to taking this range offline, the host OS invalidates all page table mappings in the system physical address table. This effectively means that the host OS can no longer access the address range taken offline. At the same time, the host OS brings two X/2 GB memory address ranges online from the previously reserved non-swappable range (e.g., M GB non-swappable range shown as part of system address map 1000 of FIG. 10). One of the X/2 GB non-swappable address range maps to the far memory (e.g., CXL NON-INTERLEAVED SET 4) and the other X/2 GB non-swappable address range maps to the near memory (e.g., DDR INTERLEAVED SET 3). In this manner, the host OS has effectively converted X GB swappable address range into a non-swappable address range. Although FIGS. 10 and 11 describe specific configurations, using similar techniques as described with respect to these figures, other configurations can also be deployed. These configurations allow for dynamic address range assignments that can be modified on the fly without requiring to reprogram the hardware registers used at the boot time.

FIG. 12 shows a flow chart 1200 of an example method for direct swap caching with noisy neighbor mitigation. In one example, steps associated with this method may be executed by various components of the systems described earlier (e.g., system 100 of FIG. 1 and system 200 of FIG. 2). Step 1210 may include provisioning a compute node with both near memory and far memory, where a host operating system (OS) associated with the compute node is granted access to a first system address map configuration and a second system address map configuration different from the first system address map configuration.

Step 1220 may include granting to the host OS, configured to support a first set of tenants, access to a first non-swappable address range associated with the near memory. As an example, as shown with respect to system address map 1000 of FIG. 10, certain tenants having a higher priority (e.g., any of VM X, Y, and Z) than the other tenants may be granted access to N GB of non-swappable address range.

Step 1230 may include granting to the host OS, configured to support a second set of tenants, different from the first set of tenants, access to: (1) a first swappable address range associated with the near memory and (2) a second swappable address range associated with the far memory to allow for swapping of cache lines between the near memory and the far memory. As an example, as shown with respect to system address map 1000 of FIG. 10, a set of tenants (e.g., any of VM 1, VM 2, . . . VM N) may be granted access to a swappable range of M GB. A low order address bit is used to carve the swappable range into smaller granular regions (e.g., each having a size of 512 MB).

Step 1240 may include increasing a size of the first non-swappable address range by switching from the first system address map configuration to the second system address map configuration. As explained earlier with respect to FIGS. 10 and 11, the host OS may increase the size of the non-swappable address range for the higher priority tenants by switching from system address map 1000 of FIG. 10 to system address map 1100 of FIG. 11. As explained earlier with respect to FIG. 11, the switch is accomplished by the host OS without invoking the BIOS, including without any reprogramming of the hardware registers. The host OS may perform several actions in order to perform the switch. As an example, the host OS takes X GB of the swappable range offline. Prior to taking this range offline, the host OS invalidates all page table mappings in the system physical address table. This effectively means that the host OS can no longer access the address range taken offline. At the same time, the host OS brings two X/2 GB memory address ranges online from the previously reserved non-swappable range (e.g., M GB non-swappable range shown as part of system address map 1000 of FIG. 10).

In conclusion, the present disclosure relates to a system including a compute node providing access to both near memory and far memory. The system may further include a host operating system (OS), configured to support a first set of tenants associated with the compute node, where the host OS having access to: (1) a first swappable range of memory addresses associated with the near memory and (2) a second swappable range of memory addresses associated with the far memory to allow for swapping of cache lines between the near memory and the far memory.

The system may further include the host OS configured to allocate memory in a granular fashion to any of the first set of tenants such that each allocation of memory to a tenant includes memory addresses corresponding to a conflict set having a conflict set size. The conflict set may include a first conflicting region associated with the first swappable range of memory addresses associated with the near memory and a second conflicting region associated with the second swappable range of memory addresses associated with the far memory, and where each of the first conflicting region and the second conflicting region having a same size that is selected to be equal to or less than half of the conflict set size.

The host OS may have access to a first non-swappable range of memory addresses associated with the near memory and the host OS may further be configured to allocate memory addresses to a second set of tenants, having a higher priority than the first set of tenants, from within only the first non-swappable range of memory addresses associated with the near memory. The conflict set size may be selected to be equal to a size of a page of memory used by the host OS for page-based memory management.

A ratio of a size of the first swappable range of memory addresses associated with the near memory and a size of the second swappable range of memory addresses associated with the far memory may be fixed. The host OS may further be configured to increase a size of the first non-swappable range of memory addresses without requiring reprogramming of hardware registers associated with the compute node.

The system may further comprise a near memory controller for managing the near memory and a far memory controller, configured to communicate with the near memory controller, for managing the far memory. The near memory controller may further be configured to analyze a metadata portion associated with a cache line to determine whether the near memory contains the cache line or whether the far memory contains the cache line.

In addition, the present disclosure relates to a method including provisioning a compute node with both near memory and far memory. The method may further include granting to a host operating system (OS), configured to support a first set of tenants associated with the compute node, access to: (1) a first swappable range of memory addresses associated with the near memory and (2) a second swappable range of memory addresses associated with the far memory to allow for swapping of cache lines between the near memory and the far memory. The method may further include allocating memory in a granular fashion to any of the first set of tenants such that each allocation of memory to a tenant includes memory addresses corresponding to a conflict set having a conflict set size.

The conflict set may include a first conflicting region associated with the first swappable range of memory addresses associated with the near memory and a second conflicting region associated with the second swappable range of memory addresses associated with the far memory, and where each of the first conflicting region and the second conflicting region having a same size that is selected to be equal to or less than half of the conflict set size.

The host OS may have access to a first non-swappable range of memory addresses associated with the near memory and the host OS is further configured to allocate memory addresses to a second set of tenants, having a higher priority than the first set of tenants, from within only the first non-swappable range of memory addresses associated with the near memory. The conflict set size may be selected to be equal to a size of a page of memory used by the host OS for page-based memory management.

A ratio of a size of the first swappable range of memory addresses associated with the near memory and a size of the second swappable range of memory addresses associated with the far memory may be fixed. The method may further include increasing a size of the first non-swappable range of memory addresses without requiring reprogramming of hardware registers associated with the compute node. The method may further include analyzing a metadata portion associated with a cache line to determine whether the near memory contains the cache line or whether the far memory contains the cache line.

In addition, the present disclosure relates to a method including provisioning a compute node with both near memory and far memory, where a host operating system (OS) associated with the compute node is granted access to a first system address map configuration and a second system address map configuration different from the first system address map configuration. The method may further include granting to the host OS, configured to support a first set of tenants, access to a first non-swappable address range associated with the near memory.

The method may further include granting to the host OS, configured to support a second set of tenants, different from the first set of tenants, access to: (1) a first swappable address range associated with the near memory and (2) a second swappable address range associated with the far memory to allow for swapping of cache lines between the near memory and the far memory. The method may further include increasing a size of the first non-swappable address range by switching from the first system address map configuration to the second system address map configuration.

The increasing the size of the first non-swappable address range is accomplished without requiring a reprogramming of hardware registers associated with the compute node. The first system address map configuration may include a first reserved non-swappable address range mapped to the near memory and a second reserved non-swappable address range mapped to the far memory, where all addresses associated with both the first reserved non-swappable address range and the second reserved non-swappable address range are marked as offline. The second address map configuration may include a portion of the first reserved non-swappable address range marked as online and a portion of the second reserved non-swappable address range marked as online. The second address map configuration may further include a portion of the first swappable address range marked as offline, where the portion of the first swappable address range marked as offline has a same size as a combined size of the first reserved non-swappable address range marked as online and the portion of the second reserved non-swappable address range marked as online.

The method may further include allocating memory in a granular fashion to any of the first set of tenants such that each allocation of memory includes memory addresses corresponding to a conflict set having a conflict set size. The conflict set may include a first conflicting region associated with the first swappable range of memory addresses associated with the near memory and a second conflicting region associated with the second swappable range of memory addresses associated with the far memory, and where each of the first conflicting region and the second conflicting region having a same size that is selected to be equal to or less than half of the conflict set size. The conflict set size may be selected to equal to a size of a page of memory used by the host OS for page-based memory management.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A system comprising:
a compute node providing access to both near memory and far memory; and
a host operating system (OS), configured to support a first set of tenants associated with the compute node, wherein the host OS having access to: (1) a first swappable range of memory addresses associated with the near memory and (2) a second swappable range of memory addresses associated with the far memory to allow for swapping of cache lines between the near memory and the far memory, wherein the host OS is configured to allocate memory in a granular fashion to any of the first set of tenants such that each allocation of memory to a tenant includes memory addresses corresponding to a conflict set having a conflict set size, and wherein the conflict set comprises:
a first conflicting region associated with the first swappable range of memory addresses associated with the near memory and a second conflicting region associated with the second swappable range of memory addresses associated with the far memory, and wherein each of the first conflicting region and the second conflicting region having a same size that is selected to be equal to or less than half of the conflict set size.

2. The system of claim 1, wherein the host OS having access to a first non-swappable range of memory addresses associated with the near memory, and wherein the host OS is further configured to allocate memory addresses to a second set of tenants, having a higher priority than the first set of tenants, from within only the first non-swappable range of memory addresses associated with the near memory.

3. The system of claim 2, wherein the host OS is further configured to increase a size of the first non-swappable range of memory addresses without requiring reprogramming of hardware registers associated with the compute node.

4. The system of claim 1, wherein the conflict set size is selected to be equal to a size of a page of memory used by the host OS for page-based memory management.

5. The system of claim 1, wherein a ratio of a size of the first swappable range of memory addresses associated with the near memory and a size of the second swappable range of memory addresses associated with the far memory is fixed.

6. The system of claim 1, wherein the system further comprises a near memory controller for managing the near memory and a far memory controller, configured to communicate with the near memory controller, for managing the far memory.

7. The system of claim 6, wherein the near memory controller is configured to analyze a metadata portion associated with a cache line to determine whether the near memory contains the cache line or whether the far memory contains the cache line.

8. A method comprising:
provisioning a compute node with both near memory and far memory;
granting to a host operating system (OS), configured to support a first set of tenants associated with the compute node, access to: (1) a first swappable range of memory addresses associated with the near memory and (2) a second swappable range of memory addresses associated with the far memory to allow for swapping of cache lines between the near memory and the far memory; and
allocating memory in a granular fashion to any of the first set of tenants such that each allocation of memory to a tenant includes memory addresses corresponding to a conflict set having a conflict set size, and wherein the conflict set comprises:
a first conflicting region associated with the first swappable range of memory addresses associated with the near memory and a second conflicting region associated with the second swappable range of memory addresses associated with the far memory, and wherein each of the first conflicting region and the second conflicting region having a same size that is selected to be equal to or less than half of the conflict set size.

9. The method of claim 8, wherein the host OS having access to a first non-swappable range of memory addresses associated with the near memory, and wherein the host OS is further configured to allocate memory addresses to a second set of tenants, having a higher priority than the first set of tenants, from within only the first non-swappable range of memory addresses associated with the near memory.

10. The method of claim 9, further comprising increasing a size of the first non-swappable range of memory addresses without requiring reprogramming of hardware registers associated with the compute node.

11. The method of claim 8, wherein the conflict set size is selected to be equal to a size of a page of memory used by the host OS for page-based memory management.

12. The method of claim 8, wherein a ratio of a size of the first swappable range of memory addresses associated with the near memory and a size of the second swappable range of memory addresses associated with the far memory is fixed.

13. The method of claim 8, further comprising analyzing a metadata portion associated with a cache line to determine whether the near memory contains the cache line or whether the far memory contains the cache line.

14. A method comprising:
provisioning a compute node with both near memory and far memory, wherein a host operating system (OS) associated with the compute node is granted access to a first system address map configuration and a second system address map configuration different from the first system address map configuration;
granting to the host OS, configured to support a first set of tenants, access to a first non-swappable address range associated with the near memory;
granting to the host OS, configured to support a second set of tenants, different from the first set of tenants, access to: (1) a first swappable address range associated with the near memory and (2) a second swappable address range associated with the far memory to allow for swapping of cache lines between the near memory and the far memory; and
increasing a size of the first non-swappable address range by switching from the first system address map configuration to the second system address map configuration.

15. The method of claim 14, wherein the increasing the size of the first non-swappable address range is accomplished without requiring a reprogramming of hardware registers associated with the compute node.

16. The method of claim 14, wherein the first system address map configuration includes a first reserved non-swappable address range mapped to the near memory and a second reserved non-swappable address range mapped to the far memory, wherein all addresses associated with both the first reserved non-swappable address range and the second reserved non-swappable address range are marked as offline.

17. The method of claim 16, wherein the second address map configuration includes a portion of the first reserved non-swappable address range marked as online and a portion of the second reserved non-swappable address range marked as online.

18. The method of claim 17, wherein the second address map configuration includes a portion of the first swappable address range marked as offline, wherein the portion of the first swappable address range marked as offline has a same size as a combined size of the first reserved non-swappable address range marked as online and the portion of the second reserved non-swappable address range marked as online.

19. The method of claim 14, further comprising allocating memory in a granular fashion to any of the first set of tenants such that each allocation of memory includes memory addresses corresponding to a conflict set having a conflict set size, and wherein the conflict set comprises:
a first conflicting region associated with the first swappable range of memory addresses associated with the near memory and a second conflicting region associated with the second swappable range of memory addresses associated with the far memory, and wherein each of the first conflicting region and the second conflicting region having a same size that is selected to be equal to or less than half of the conflict set size.

20. The method of claim 19, wherein the conflict set size is selected to be equal to a size of a page of memory used by the host OS for page-based memory management.

* * * * *